United States Patent
Gabelli et al.

[11] Patent Number: 5,971,620
[45] Date of Patent: Oct. 26, 1999

[54] ROLLING ELEMENT BEARING COMPRISING A ZIRCONIUM MATERIAL

[75] Inventors: Antonio Gabelli, Ijsselstein; Tin Yau Wan, Houten, both of Netherlands

[73] Assignee: SKF Industrial Trading & Development Company B.V., Nieuwegein, Netherlands

[21] Appl. No.: 08/851,893

[22] Filed: May 6, 1997

[30] Foreign Application Priority Data

May 15, 1996 [NL] Netherlands ............................ 1003136

[51] Int. Cl.$^6$ ...................................................... F16C 33/32
[52] U.S. Cl. ............................ 384/491; 384/492; 384/913
[58] Field of Search ...................................... 384/491, 492, 384/565, 625, 913

[56] References Cited

U.S. PATENT DOCUMENTS 5,150,398  9/1992  Nishioka et al. ........................ 384/492
5,203,228  4/1993  Miyawaki et al. ...................... 384/492
5,439,297  8/1995  Kitayama .

FOREIGN PATENT DOCUMENTS 61-150912  7/1986  Japan .
61-197487  9/1986  Japan .
1-112026   4/1989  Japan .
4-069406   3/1992  Japan .

*Primary Examiner*—Lenard A. Footland
*Attorney, Agent, or Firm*—Oliff & Berridge, PLC

[57] ABSTRACT

A rolling element bearing comprises an outer ring and an inner ring which enclose a bearing space containing rolling elements which are in rolling contact with the raceways of both rings. At least the contact surface layer of one of the rings and/or rolling elements consists of a zirconium material. At least one of the rings has a composite layered structure comprising an outer layer of steel facing away from the bearing space and an inner layer of a zirconium material.

18 Claims, 1 Drawing Sheet

ROLLING ELEMENT BEARING COMPRISING A ZIRCONIUM MATERIAL

BACKGROUND OF THE INVENTION

The invention is related to a rolling element bearing, comprising an outer ring and an inner ring which enclose a bearing space containing rolling elements which are in rolling contact with the raceways of both rings.

Such rolling element bearings are widely known, and may take the form of for instance deep groove ball bearings, spherical or taper roller bearings, needle roller bearings etc. Generally, these types of bearings behave satisfactorily; however, under more demanding conditions such as in case of marginal lubrication, extreme temperatures and vibrations further improvements are necessary.

In this respect, proposals have been made to apply ceramic materials for the rings and/or rolling elements, such as silicon nitride, silicon carbide, aluminium oxide or cermets. Usually those materials are applied in combination with the normal steel parts.

Hybrid bearings (ceramic balls and steel rings) have been used successfully in some very specific applications, in particular, silicon nitride balls for high speed precision (spindle) bearings. The low density and high rigidity or stiffness of the silicon nitride plays a very important role in reducing the centrifugal force acting on the balls and the friction in contacts, thus giving excellent performance, in particular under marginal lubrication conditions.

The disadvantage of bearings having rings or rolling elements which are made with a combination of materials i.e. hybrid bearings, is that the different materials applied therein behave in a different way under loading and temperature. First of all, the specific weights thereof differ considerably, resulting in dynamic imbalances and non-uniform loading of the rolling elements. Moreover, due to the different thermal expansion coefficients, the internal bearing clearance cannot be maintained within the required boundaries. As a result, the useful service life of the bearings in question is impaired.

SUMMARY OF THE INVENTION

The object of the invention is to provide a bearing with an improved behavior under demanding conditions, as mentioned above, and with an acceptable service life. This object is achieved in that at least the contact surface layer of one of the rings and/or rolling elements consists of a zirconium material.

BRIEF DESCRIPTION OF THE DRAWINGS

FIG. 4 shows a detail of part of the inner ring and the ball.

DETAILED DESCRIPTION OF PREFERRED EMBODIMENTS

Figure 1:
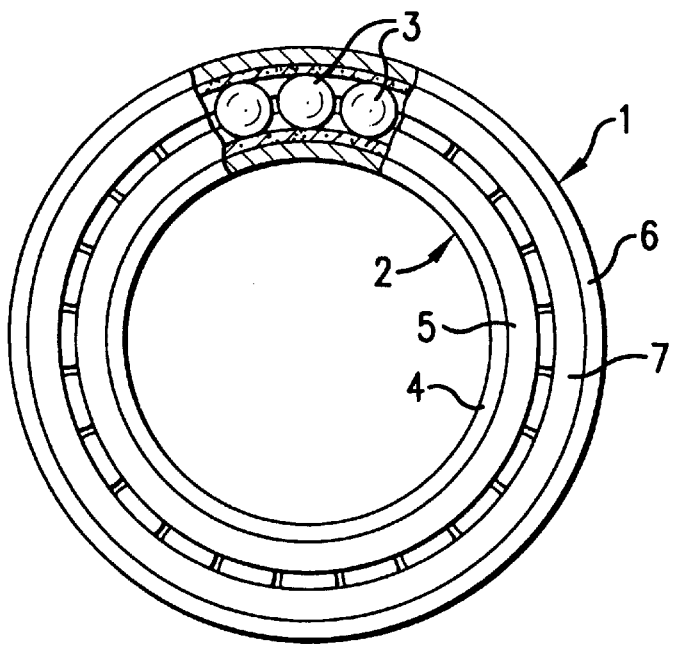
FIG. 1 shows a deep groove ball bearing according to the invention, in side view and partially in longitudinal section.

As the specific weight of zirconium is similar to the specific weight of steel, no imbalances will occur, even in case of concentricity errors in a composite part. Moreover, the thermal expansion coefficient and Young's modulus of these materials are practically the same, which means that no cracks will develop under varying temperature conditions.

According to the invention, at least one of the rings has a composite layered structure comprising an outer layer of steel facing away from the bearing space and an inner layer of a zirconium material. Also, at least one of the rolling elements has an outer shell of a zirconium material which encloses a steel core.

In a preferred embodiment, the zirconium material is a partially stabilised zirconia ceramic comprising 95% $ZrO_2$, 5% $Y_2O_3$ and 0.01% $Al_2O_3$. Such zirconia ceramic has a higher fracture toughness and bending strength than the usual silicon nitride, resulting in a higher rolling contact fatigue resistance (also in the case of sliding contacts).

The added benefits of this solution is the low cost of raw materials for the making of zirconia ceramics and the possible ease of processability and workability of zirconia. For instance, grinding can be used as possible finishing process with feed rate of 200–1200 um/min, (for steel the typical fine grinding feed rate is about 1500 um/min). Initial cost saving on the silicon nitride counterpart is estimated at a factor five.

A second embodiment of this invention is the use of zirconia in the making of hybrid bearings parts such as rings or rolling elements produced by direct sintering or press-fitting of zirconia ceramic on steel. This technology is made possible by the great similarity in the elastic constants of zirconia ceramic and steel, thermal expansion; Young's modulus is practically equal to the one of steel. Furthermore, the risk of unbalanced mass is also avoided, in case of concentricity errors of the two part, because similar density between the steel and zirconia materials.

In service, the rolling elements of the bearing during rolling contact under nominal load generate shear stresses in the ring parts adjoining the raceway thereof. According to the invention, preferably the thickness of the zirconium contact surface layer of the rings is of the same order of magnitude as the depth (a) at which said shear stresses have been substantially reduced to zero.

In this embodiment, the integrity of the rings can be maintained due to the fact that the area where the zirconium material and the steel material are merged, is outside the zone of high shear stresses.

Analogously, thickness (a) of the zirconium contact surface layer of the rolling elements is of the same order of magnitude as the depth at which said shear stresses have been substantially reduced to zero.

According to a further embodiment, the contact area between said rolling elements and raceways under nominal load is flattened, said contact area having a nominal length (b) in rolling direction, wherein the thickness of the zirconium contact surface layer is of the same order of magnitude as the nominal length (b) of said area.

In summary the following advantageous embodiments of bearings are made possible by the invention:

Bearing with improved wear/contamination resistant bearing with hybrid rolling elements.

Bearing for difficult lubrication, thermal and environmental conditions (grease lubrication at high speeds, high temperature, corrosive environments, hydrogen corrosion, vacuum etc).

Bearing for superior life expectancy for normal operating conditions (better resistance against surface initiated fatigue). Also the following problems are solved:

Unbalanced mass in hybrid rolling bearings.

Uneven internal bearing clearance due to temperature changes in hybrid rolling elements bearings.

Use of combined hybrid sintering technology (steel and ceramic coupled) in bearing components.

Use of press fitting or chemical or mechanical bonding technology (between ceramic and steel) for making bearing parts.

The invention will further be described with reference to an embodiment shown in the figures.

Figure 3:
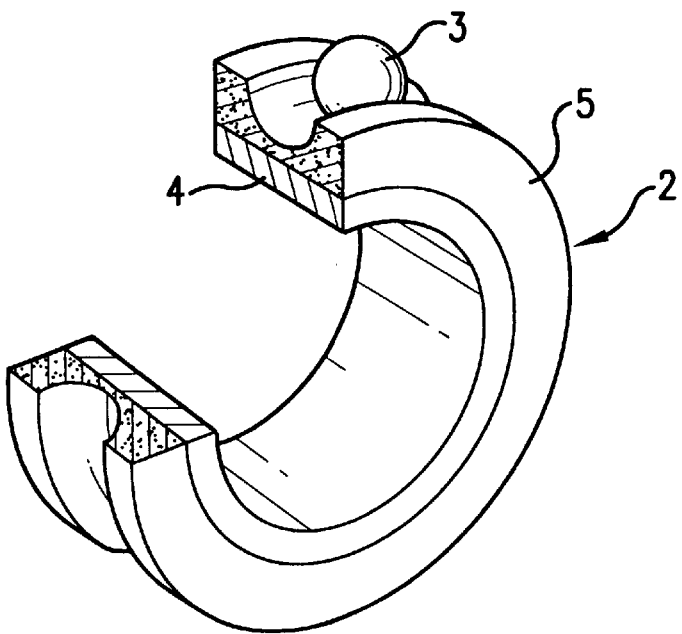
FIG. 3 shows a part of the inner ring of the bearing according to FIG. 1, partially perspective and in cross-section.

The bearing shown in FIG. 1 comprises an outer ring 1, an inner ring 2, and balls 3. As shown in FIG. 3, the inner ring comprises an inner steel layer 4, and an outer layer 5 of zirconia ceramic material. Analogously, the outer ring comprises an outer layer of steel 6, as well as an inner layer of zirconia material 7.

Figure 2:
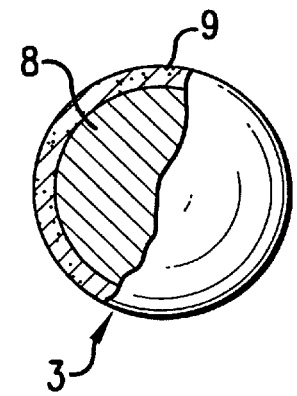
FIG. 2 shows a ball, partially in cross section.

As shown in FIG. 2, the balls consist of a steel core 8, surrounded by a shell 9 of zirconia material.

In the bearing according to the Figures, all contact surfaces of the rings 1, 2, and of the balls 3 consist of a zirconia ceramic material, which gives an improved service life and better wear characteristics. On the other hand, the mechanical properties of the zirconia ceramic material layers and of steel are, apart from their hardness, about the same, which means that the rings and balls behave as a unity. Also, no cracks will occur between the layers of these composite components, which in particular is due to the fact that the thermal coefficient of expansion of the materials is about the same.

The detail of FIG. 4 shows, on an enlarged scale, a part of the inner ring 2 as well as a ball 3. Also shown is the schematic shear distribution (c) in the ring part adjoining the raceway, which shear stress initially increases from the raceway surface onwards, and subsequently gradually decreases to almost zero at a certain depth.

According to the invention, the thickness (a) of the zirconium contact surface layer of the inner ring is about the same as this depth where shear stresses are about zero, which means that the boundary between zirconium layer 5 and steel layer 4 is not greatly affected by such shear stresses.

Furthermore, in service the contact surfaces of ball 3 and the raceway are flattened. The length dimension, in circumferential direction of the flattened contact areas under nominal is denoted by (b). According to the invention, the thickness of the zirconium contact surface layer is of the same order of magnitude as the nominal length (b) of said area.

What is claimed is:

1. Rolling element bearing, comprising an outer ring with a raceway and an inner ring with a raceway, the outer ring and inner ring together enclosing a bearing space containing one or more rolling elements which are in rolling contact with the raceways of both rings, wherein the inner ring and outer ring each have a contact surface layer contacting the one or more rolling elements and the one or more rolling elements have a contact surface layer contacting both rings, and wherein at least one of the contact surface layers comprises a zirconium material, and wherein at least one or more of the rolling elements has an outer shell of the zirconium material as the contact surface layer which encloses a steel core.

2. Bearing according to claim 1, wherein the zirconium material is a partially stabilized zirconia ceramic comprising about 95% $ZrO_2$, about 5% $Y_2O_3$ and about 0.01% $Al_2O_3$ based on the weight of the zirconium material.

3. Bearing according to claim 1, wherein the contact surface layer comprising zirconium of the one or more rolling elements has a thickness which is the same order of magnitude as the steel core.

4. Bearing according to claim 1, wherein the at least one contact surface layer comprising zirconium is sintered onto a steel layer of the rings or a steel core of the one or more rolling elements.

5. Bearing according to claim 1, wherein the at least one contact surface layer comprising zirconium is press-fitted onto a steel layer of the rings or a steel core of the one or more rolling elements.

6. Bearing according to claim 1, wherein during rolling contact under nominal load, the one or more rolling elements generate shear stresses in the ring parts adjoining the raceway thereof, and wherein the thickness of the zirconium contact surface layer of the inner ring, outer ring or both is of the same order of magnitude as the depth at which said shear stresses have been substantially reduced to zero.

7. Bearing according to claim 1, wherein during rolling contact under nominal load, the one or more rolling elements generate shear stresses in the ring parts adjoining the raceway thereof, and wherein the thickness of the contact surface layer comprising zirconium of the one or more rolling elements is of the same order of magnitude as the depth at which said shear stresses have been substantially reduced to zero.

8. Bearing according to claim 1, wherein during rolling contact under nominal load, the one or more rolling elements generate shear stresses in the ring parts adjoining the raceway thereof and the contact area between the one or more rolling elements and the raceways under nominal load are flattened, the contact area having a nominal length in a rolling direction, and wherein the thickness of the at least one contact surface layer comprising zirconium is of the same order of magnitude as the nominal length of said area.

9. Bearing according to claim 1, wherein the one or more rolling elements comprise balls or rollers.

10. Rolling element bearing, comprising an outer ring with a raceway and an inner ring with a raceway, the outer ring and inner ring together enclosing a bearing space containing one or more rolling elements which are in rolling contact with the raceways of both rings, wherein the inner ring and outer ring each have a contact surface layer contacting the one or more rolling elements and the one or more rolling elements have a contact surface layer contacting both rings, wherein at least one of the contact surface layers comprises a zirconium material, wherein at least one of the inner ring or outer ring has a composite layered structure comprising an outer layer of steel facing away from the bearing space and an inner layer of the zirconium material as the contact surface layer and wherein the at least one contact surface layer comprising zirconium of the inner ring, outer ring or both has a thickness which is of the same order of magnitude as the steel layer.

11. Bearing according to claim 10, wherein the one or more rolling elements comprise balls or rollers.

12. Bearing according to claim 10, wherein during rolling contact under nominal load, the one or more rolling elements generate shear stresses in the ring parts adjoining the raceway thereof and the contact area between the one or more rolling elements and the raceways under nominal load are flattened, the contact area having a nominal length in a rolling direction, and wherein the thickness of the at least one contact surface layer comprising zirconium is of the same order of magnitude as the nominal length of said area.

13. Bearing according to claim 10, wherein at least one or more of the rolling elements has an outer shell of the zirconium material which encloses a steel core.

14. Bearing according to claim 13, wherein the contact surface layer comprising zirconium of the one or more rolling elements has a thickness which is the same order of magnitude as the steel core.

15. Bearing according to claim 10, wherein the zirconium material is a partially stabilized zirconia ceramic comprising about 95% $ZrO_2$, about 5% $Y_2O_3$ and about 0.01% $Al_2O_3$ based on the weight of the zirconium material.

16. Bearing according to claim 10, wherein during rolling contact under nominal load, the one or more rolling elements generate shear stresses in the ring parts adjoining the raceway thereof, and wherein the thickness of the contact surface layer comprising zirconium of the one or more rolling elements is of the same order of magnitude as the depth at which said shear stresses have been substantially reduced to zero.

17. Bearing according to claim 10, wherein the at least one contact surface layer comprising zirconium is sintered onto a steel layer of the rings or a steel core of the one or more rolling elements.

18. Bearing according to claim 10, wherein the at least one contact surface layer comprising zirconium is press-fitted onto a steel layer of the rings or a steel core of the one or more rolling elements.

\* \* \* \* \*